United States Patent [19]

Green, Jr.

[11] Patent Number: 4,479,168
[45] Date of Patent: Oct. 23, 1984

[54] ELECTROLYTIC CAPACITOR WITH A HERMETIC SEAL

[75] Inventor: Gilbert E. Green, Jr., Bennington, Vt.

[73] Assignee: Sprague Electric Company, North Adams, Mass.

[21] Appl. No.: 562,931

[22] Filed: Dec. 19, 1983

[51] Int. Cl.³ .................. H01G 9/06; H01G 9/10
[52] U.S. Cl. ........................... 361/433; 29/570
[58] Field of Search ................ 361/433; 29/570

[56] References Cited

U.S. PATENT DOCUMENTS

| | | | |
|---|---|---|---|
| 3,600,017 | 8/1971 | Scherer | 287/189.365 |
| 3,624,458 | 11/1971 | Howell et al. | 317/230 |
| 3,922,773 | 12/1975 | Mariew et al. | 361/433 |
| 4,065,636 | 12/1977 | Herczog | 174/52 S |

FOREIGN PATENT DOCUMENTS 1514872  6/1978  United Kingdom .

Primary Examiner—Michael L. Gellner
Assistant Examiner—Douglas S. Lee

[57] ABSTRACT

An electrolytic capacitor has a glass-to-metal hermetic seal which has a metal washer bonded to a compression ring of the same outer diameter but larger inner diameter than the washer. A mass of glass containing a tubular feed-through having substantially the expansion coefficient of the glass abuts the inner diameter of the ring and is bonded to the washer. The seal is attached to an open end of a capacitor housing around the bottom periphery of the washer.

16 Claims, 2 Drawing Figures

ELECTROLYTIC CAPACITOR WITH A HERMETIC SEAL

BACKGROUND OF THE INVENTION

This invention pertains to an electrolytic capacitor having a glass-to-metal seal, and more particularly a compression seal. The seal of this invention has a washer bonded to a compression ring and to a mass of glass containing a tubular feed-through. The outer side of the washer is bonded to an end of a capacitor casing around the periphery of both.

Glass-to-metal hermetic seals are well-known in the capacitor art. These seals are of two main types: matched seals in which the coefficients of expansion of the glass and metal members are substantially the same, giving a strain-free seal; and compression seals in which the glass and central metal terminal are retained under compression by an outer metal member, usually a ring.

Unfortunately, matched seals are fairly fragile and can be easily damaged. Prior compression seals generally have had a central glass mass containing a feed-through surrounded by a metal eyelet or ring which compresses the glass. There has been a problem of corrosion or attack of the ring by the electrolyte, and plated and clad rings and/or eyelets have been used as a result.

Plated materials have been unsatisfactory generally because of pinholes present or developing in the plating. Clad members are more expensive, and the designs of seals incorporating them have been bulky.

SUMMARY OF THE INVENTION

It is a feature of this invention to provide a compact glass-to-metal seal which is economical to manufacture and which increases the volumetric efficiency of an electrolytic capacitor utilizing it. Preferably, a matched glass is used and the seal is a wetted compression seal.

The seal has a flat metal washer to which a compression ring is attached along the horizontal bottom surface of the ring. The outer diameters of the ring and washer are substantially the same, but the inside diameter of the ring is larger than that of the washer so that the washer extends laterally inwardly beyond the ring. A glass bead having a central hole therein through which a tubular feed-through passes is located inside the ring and rests on the washer. The glass is fused to the feed-through, the ring, and that portion of the washer which extends inwardly of the ring. The ring radially compresses the glass and, since it is attached to the washer, exerts radial compression on it also.

The face of the seal opposite to the ring consists of a washer surface, glass, and an end of the tubular feed-through. For simplicity, this face shall be called the bottom of the seal. An electrode connector is passed through the feed-through, and the bottom of the seal is attached to an open end edge of a capacitor container around the periphery of both. In effect, the seal sits on an end of the capacitor instead of being located in it, and thus increases the volumetric efficiency of the capacitor inasmuch as a shorter housing can be used. Thus, the seal is joined to the casing by the washer and there is no direct connection of the casing and the ring.

The tubular feed-through and electrode connector are welded together external of the seal, sealing off the tube at the same time. An external lead is attached to this weld.

The seal may be used with capacitors containing wound foil sections as well as those containing porous pellet anodes. In the latter case, the anode riser passes through and is welded to the feed-through. The housing is in the shape of a can, and the seal is attached to the mouth thereof around the periphery, preferably by welding. The can serves as cathode and preferably has a porous sleeve attached to the inside surface of the can to provide a large surface area cathode.

When a wound foil section is used as capacitor section, the housing may be in the form of a can with one glass-to-metal seal. Preferably, the housing is in the form of a sleeve with a glass-to-metal seal at both ends thereof. One electrode is connected to one seal, and the other, to the second seal.

The seal is preformed, is relatively simple to manufacture, and uses symmetrically formed components so that no orientation is necessary. To this end, the compression ring is chamfered at the inner and outer diameters of both faces, although the chamfers on only one face are utilized in the seal, so that no special orientation of this ring is needed. These chamfers serve to contain a brazing compound when one is used to attach the ring to the washer. By containing it, no weld or braze material extends to the edge of the washer to interfere with the attachment of the washer to the capacitor housing.

Briefly, the seal is manufactured in the following manner. A graphite fusion fixture has a bottom portion with at least one circular indentation in it. Into this indentation or die is placed a metal washer; on top of it is placed a braze ring which is smaller than the washer and on that, a compression ring having the same outer diameter as the washer. A glass bead is placed in the cavity defined by the washer and ring, and it has a central hole through it. The top portion of the fixture, which also has at least one circular depression in its inner side with a central opening in each, is placed over the assembly. A tublular feed-through is passed through the hole and bead, with one end resting against the bottom of the die. The unit is placed in a furnace and heated to a high enough temperature to melt the braze and soften the glass so it completely fills the volume defined by the ring, washer, and feed-through. On cooling, the braze solidifies bonding the ring and washer, and the glass also solidifies bonding the tube and washer and the ring.

DESCRIPTION OF THE PREFERRED EMBODIMENTS

Figure 1:
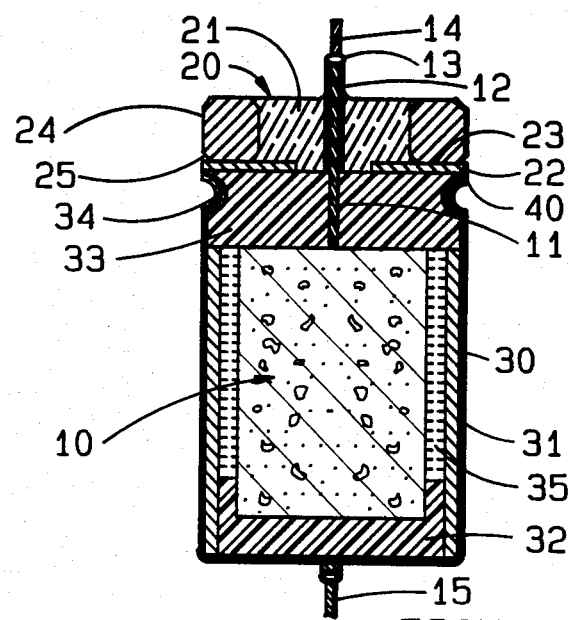
FIG. 1 is a cross-section of a capacitor of the present invention utilizing a porous pellet anode.
Figure 2:
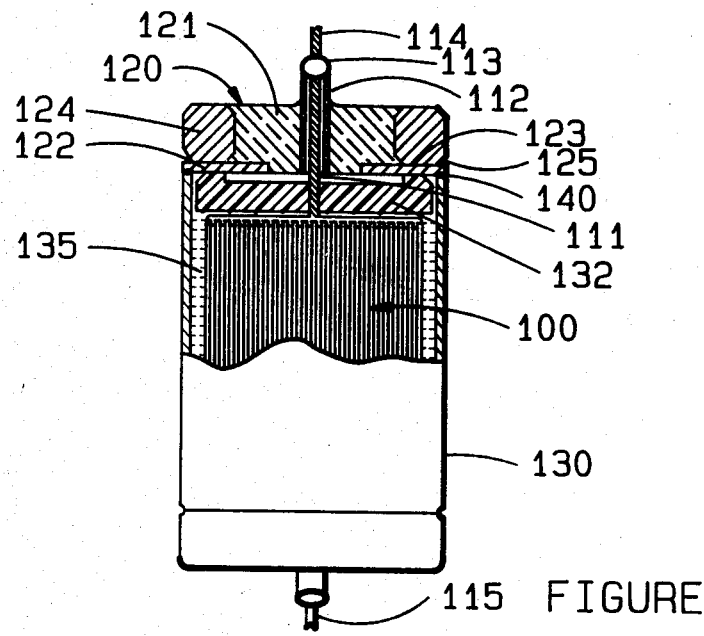
FIG. 2 is a partial cross-section of a capacitor of this invention utilizing a wound foil capacitor section.

The capacitor of the present invention utilizes either a porous anode, shown in FIG. 1, or a wound foil capacitor section, shown in FIG. 2.

In FIG. 1, porous tantalum anode 10 has an anode riser 11 which extends into hollow tube 12, preferably made of tantalum, and is sealed to it by weld 13 which also seals tube 12. An external lead 14 is attached to weld 13.

Seal 20 has a glass bead 21 surrounding and fused to tube 12 and also bonded to and filling the aperture of metallic washer 22 between its inner periphery and tube 12. Washer 22 is in turn bonded, by a braze or weld 23 to compression ring 24 completely along the bottom of ring 24 which surrounds and radially compresses glass 21. Ring 24 has chamfered corners 25. The chamfers 25 on the outer diameter of ring 24 are identical, so that it makes no difference which side of ring 24 faces washer 22 during assembly. Similarly, the chamfers on the inner diameter are the same but need not be as great as those on the outside. The chamfers facing washer 25 serve to contain braze or weld 23 so that it does not extend to the edge of washer 22 and ring 24 and interfere with the bonding of washer 22 to the capacitor casing 30.

It is preferred that glass bead 21 has a coefficient of expansion similar to that of tube 12 so that the glass-tube part of the seal is a matched seal, and the final seal 20 in which the glass is compressed by ring 24 is a wetted compression seal.

Capacitor case 30 serves as cathode and is in the form of a can, preferably tantalum, which bears a porous sintered cathode sleeve 31, also preferably tantalum. Spacer 32, preferably polytetrafluoroethylene, fits against the bottom of casing 30 and cathode liner 31 and receives anode 10 which may be pressed against lower spacer 32 by optional upper gasket 33, also preferably polytetrafluoroethylene. Electrolyte 35, conventionally sulfuric acid, occupies the space between the anode 10 and casing 30. An external cathode lead 15 is attached to the bottom of casing 30, preferably by welding.

Upper gasket 33, if used, is surrounded by a ring 34, and casing 30 is necked-in at this point. Where riser 11 passes through gasket 33, it may be coated with a caulking or adhesive material such as polyisobutylene or polybutadiene. Seal 20 is sealed to casing 30 around the outer periphery of the underside of washer 22 to the top edge of casing 30 by weld 40.

When the capacitor section is a wound foil section as shown in FIG. 2, capacitor section 100 consists of contiguously wound anode and cathode foils with interleaved spacer material, preferably paper. An electrode connection 111, preferably a wire, is attached to one of the foils by known means and extends into a tube 112 and is connected to it at weld 113 which also seals off tube 112. An external lead 114 is attached to weld 113.

Hermetic seal 120 is made of a mass of glass 121 surrounding and bonded to tube 112 and also bonded to and filling the aperture of metal washer 122 between its inner periphery and tube 112. Washer 122 is in turned bonded by a braze or weld 123 to metal compression ring 124 which surrounds and radially compresses glass 121. Ring 124 has chamfered edges 125 as described in FIG. 1.

Metal housing 130 may be open at both ends in which case a second seal identical with seal 120 is used at the lower end; a second electrode connection is made to this second seal, and external lead 115 is attached as described above. Electrolyte 135 impregnates section 100 and fills the space between section 100 and housing 130.

Spacer 132, preferably polytetrafluoroethylene, prevents vibration of section 100 and fills the space between the top of section 100 and seal 120. Seal 120 is attached by weld 140 between the outer bottom periphery of washer 122 and the top edge of housing 130.

When a porous tantalum pellet is used as the capacitor section, the washer 22 and tube 12 are both tantalum. Housing 30 may be tantalum with a porous tantalum cathode liner 31 as shown in FIG. 1, or housing 30 may be silver, nickel, or copper.

When a wound tantalum foil section is used as the capacitor section, the tube 112 is tantalum and the housing 130 may be tantalum, titanium, or stainless steel. With the first two materials, the washer 122 is tantalum, and with the last material, the washer 122 would be stainless steel. The electrolyte 135 may be any of the known electrolytes, e.g. borate or phosphate electrolytes.

Since ring 24 is not attached directly to the capacitor housing in either embodiment, it may be made of a variety of materials. The compression ring is preferably nickel, although nickel-plated steel, Monel metal, or any metal or alloy which has a higher, preferably about 2 times higher, coefficient of expansion ( and contraction) than tantalum. Since this ring never contacts the electrolyte, it does not need to be compatible with it. Since the only parts of the seal which contact the electrolyte are the tube, glass, and washer, only they need to be compatible with the electrolyte.

The washer may be welded to the ring, but for ease of manufacture when a tantalum washer and nickel ring are used, a copper braze is preferred. Other brazes could also be used, e.g. silver, alloys of copper and silver, and still others known in the art.

A typical glass which may be used in this seal contains the following constituents in weight percent: about 50 to 75% silica, about 1 to 10% alumina, about 5 to 10% sodium oxide, and about 10 to 25% boron trioxide. The glass does not need to have the same coefficient of expansion as the tantalum, but preferably it is a matched glass and the seal is a wetted compression seal.

The seal unit may be made in the following manner. A tantalum washer is placed in a graphite fusion fixture, and over it is placed a copper braze ring. A chamfered nickel compression ring having a larger internal diameter than the washer, but the same outside diameter, is placed on the braze ring. However, if the washer is to be welded directly to the ring, this is done prior to assembly, and the welded washer-ring unit is placed in the fixture, washer side down. A glass bead having a central opening through the bead is placed in the aperture of the various rings. The top of the graphite fixture having a hole therein corresponding to the opening in the bead is placed on the fixture. A hollow, tubular feed-through is passed through the hole and the glass bead.

The fixture is placed in an oven or other suitable heating means and subjected to a temperature above the melting point of the braze, i.e. above 1082° C. for a copper braze and preferably about 100° C. higher. The components are held at this temperature long enough to allow the braze to melt and wet the nickel ring and tantalum washer interface by capillary action. The wetting is contained by the lower chamfers on the outer and inner diameter of the nickel ring.

Meanwhile, the glass which softens at about 700° C. is sufficiently fluid to fill the cavity formed by the feed-through, ring, and washer, wetting these with a positive meniscus at the interfaces. When a welded ring-washer unit is used, the unit only need be heated high enough to soften and flow the glass. A braze is preferred as no pre-assembly step is needed.

The assembly is allowed to cool to ambient temperature. As the glass solidifies, it contracts approximately the same amount as the tantalum when a matched glass is used, but the higher contraction ring causes radial compression of the washer, now brazed to it on one side, and the glass.

It is believed that the glass bonds to the nickel ring as well as to the tantalum washer and feed-through. Even if it does not bond to the nickel, the ring exerts sufficient compression for the seal to be useful over the capacitor operating range of −55° C. to 200° C.

It is preferred that the glass be matched to tantalum i.e., have approximately the same coefficient of expansion as tantalum, although this is not necessary, as the ring holds the glass under compression.

The seal of this invention offers many advantages over prior art seals, in that the strong, wetted compression seal provided herein is only about 50-80% of the length of prior art seals, thereby saving both material and capacitor volume. When a tantalum washer is used, the amount of tantalum required is about 33% of other tantalum seals. All components are simple symmetrical shapes which require no orientation for assembly, thus simplifying assembly and reducing tooling requirements. The seal is easily welded or brazed to the capacitor case, and the positioning of the seal on the case face or edge allows both a shorter case to be used, saving material, and a less costly sealing and finishing operation to be used.

What is claimed is:

1. An electrolytic capacitor comprising a metal housing, an electrolytic capacitor section, an electrolyte and a hermetic glass-to-metal seal in sealing engagement on an end of said housing, said seal having a flat metal washer bonded on one flat side to said end of said housing around the periphery of both, said washer being bonded on its other flat side to a metal compression ring of the same outside diameter as said washer adjacent the outer periphery of said washer and completely along a bottom surface of said ring, said ring having an aperture therein, said aperture of said ring being of greater inside diameter than the aperture of said washer whereby said washer extends inwardly beyond said ring, a body of glass abutting said ring and said washer, said body having an aperture therein through which a hollow tube extends, said glass being bonded to said washer and said tube, and said ring radially compressing said glass.

2. A capacitor according to claim 1 wherein said ring is maintained out of contact with said electrolyte by said washer and said glass.

3. A capacitor according to claim 1 wherein said ring is symmetrical and chamfered along both top and bottom edges of both inner and outer diameters.

4. A capacitor according to claim 1 wherein said capacitor section is an anodized, porous tantalum pellet having a tantalum wire riser extending therefrom, said tube being tantalum, said riser passing into said tube and being connected to said tube by a weld above and external of said seal, said weld closing the upper end of said tube.

5. A capacitor according to claim 4 wherein said glass has a coefficient of expansion about that of tantalum.

6. A capacitor according to claim 4 wherein said housing is a can selected from the group of tantalum, nickel, and copper cans and said washer is a tantalum washer.

7. A capacitor according to claim 6 wherein said can is a tantalum can bearing a porous inner sleeve of tantalum bonded thereto and having a spacer in the bottom thereof into which said pellet fits.

8. A capacitor according to claim 7 wherein said ring is a nickel ring, and said washer is attached to said ring by a braze or weld.

9. A capacitor according to claim 7 wherein said pellet is firmly held in said bottom spacer by an upper gasket beneath said seal and through which said riser extends, said upper gasket being compressed against the top of said pellet.

10. A capacitor according to claim 1 wherein said capacitor section is a wound foil section in which an anode and a cathode foil are contiguously wound with interleaved spacer material, each foil having an electrode connector attached thereto which extends beyond an edge of said section, a spacer between said section and said seal through which a first connector passes, said connector extending into said hollow tube and being welded thereto externally of said seal, said weld closing off the upper end of said tube.

11. A capacitor according to claim 10 wherein said section is a tantalum foil section, said connector is a tantalum wire, said tube is a tantalum tube, and said housing is a metal housing selected from the group of tantalum, titanium, and stainless steel.

12. A capacitor according to claim 11 wherein said housing is tantalum or titanium and said washer is tantalum.

13. A capacitor according to claim 12 wherein said ring is a nickel ring and said washer is attached to said ring by a braze or weld.

14. A capacitor according to claim 11 wherein said housing is stainless steel and said washer is stainless steel.

15. A capacitor according to claim 11 wherein said housing is a tubular housing, each end of which is sealed by said hermetic seal.

16. A capacitor according to claim 11 wherein said glass bead has about the same coefficient of expansion as that of tantalum.

* * * * *